E. B. CLEMENT.
Churn.
No. 8,671.    Patented Jan. 20, 1852.
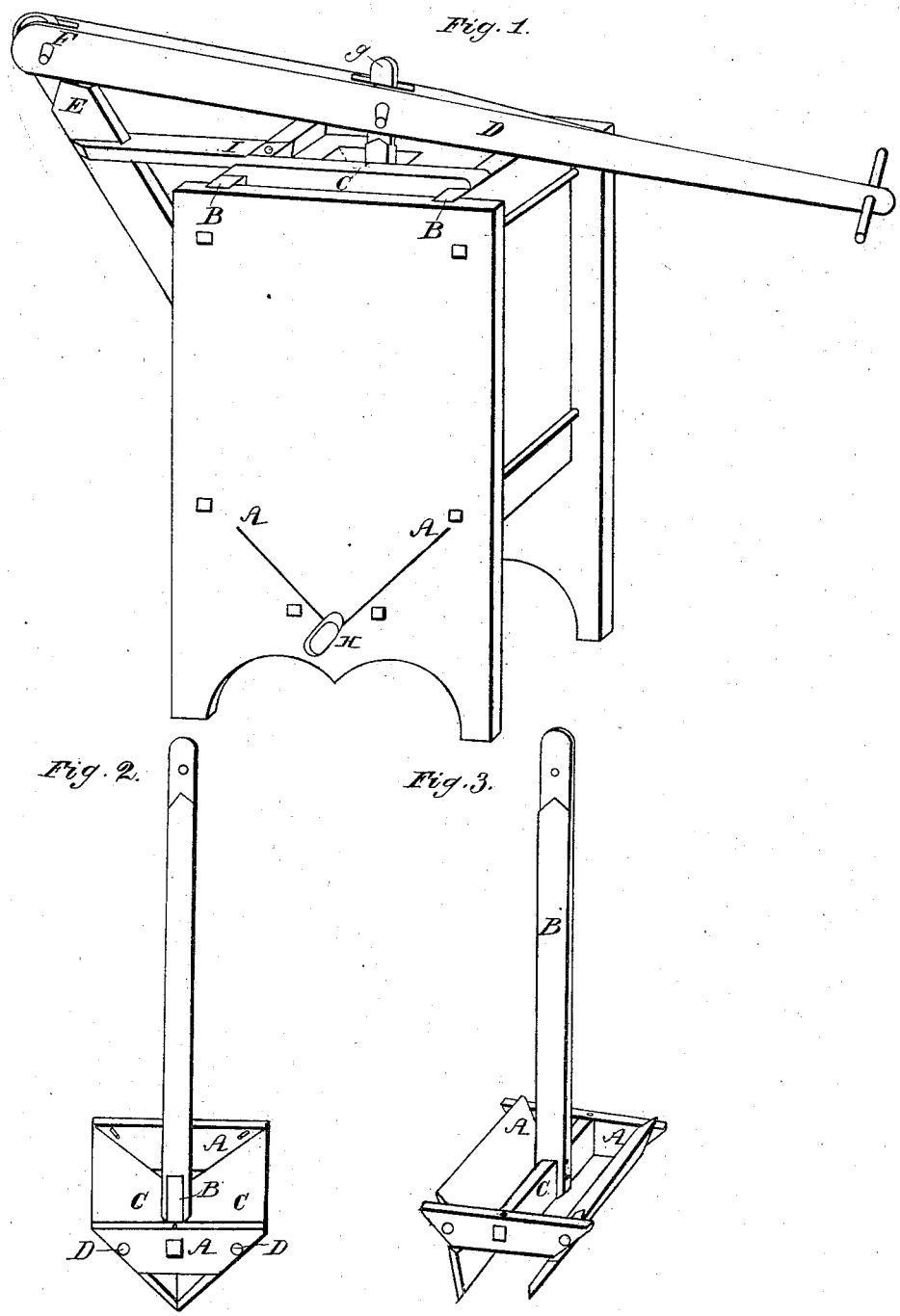

UNITED STATES PATENT OFFICE.

E. B. CLEMENT, OF BARNET, VERMONT.

CHURN.

Specification of Letters Patent No. 8,671, dated January 20, 1852.

*To all whom it may concern:*

Be it known that I, EDWIN B. CLEMENT, of Barnet, in the county of Caledonia and State of Vermont, have invented a new and Improved Mode of Constructing Churns; and I do hereby declare that the following is a full and exact description thereof, reference being had to the accompanying drawings and to the letters of reference made thereon.

The nature of my invention consists in so constructing the churn, that the cream or milk shall be forced up between the dasher and sides of the vessel when the dasher is pressed down through the cream, which dasher is made to open when it is raised so that the cream may pass through its center, closing again at the top of the cream when in operation, thereby operating most thoroughly on the whole mass, and with the least force and time to accomplish the complete separation of the butter from the other constituents of the milk.

To enable others skilled in the art to make and use my invention, I will proceed to describe its construction and operation.

I construct my vessel to hold the cream or milk (see Figure 1 of the accompanying drawings) in the form of a box (except the bottom which will be hereinafter described) whose length is nearly equal to its depth to where the bottom begins, and width about one half its length. The bottom I make of two pieces square to each other, the corner pointing downward in the center indicated by the lines A, A, in the drawings, Fig. 1. The sides and bottom I groove into the ends letters B, B, the whole secured by iron rods. The cover is made to fit the mouth of the vessel, which cover is to be sunk in a little ways supported by two cross pieces, letter C, in the drawings. The dashes (see Fig. 2) I make to fit the churn, consists of two end pieces reaching nearly across the width of the churn to where the bottom begins which pieces are beveled the same as the bottom of the vessel, and extending downward about one half of the depth of the bottom, see letters A, A. I mortise a cross piece into these ends, letter B, which piece runs lengthwise of the vessel. I then make two loose or swinging floats, see letters C, C, which floats when closed at the bottom will fit the bottom of the vessel. These floats are made to turn or swing on a pivot or gudgeon made on each end of the floats, which gudgeons fit in holes made in the end pieces, see letters D, D. When these floats are closed at the bottom the upper edges of the floats may reach to three eighths, or one half of an inch from the sides of the vessel, which space is left for the cream to pass up through in the operation. When this dasher is raised, see Fig. 3, these floats will swing apart and strike a pin in each end of one of the end pieces, see letters A, A, leaving the floats inclining toward the center, so that they may more readily close when they strike the cream in their downward course. The handle or staff, see letter B, Fig. 3, is made fast to the cross piece, see letter C, Fig. 3, extending upward through the cover of the vessel.

To render the working of my churn easy, I attach a brake or lever as seen in Fig. 1, letter D. One end of this lever I attach to the upper end of a port or an arm, see letter E, which arm is supported by a brace extending from the side of the churn to this arm, see letter I. The lower end of this arm is made fast to the side of the vessel at the bottom. I make a joint of the upper end of this arm and one end of the lever, and insert a pin, which pin operates as a fulcrum, see letter F. The upper end of the staff to the dasher is made with a tenon, which tenon passes through a mortise in the lever, see letter G, which mortise is of sufficient length to give the dasher staff a chance to play when in operation, inserting a pin to keep them together. At the other end of this lever I insert a pin for a handle which is to be grasped by the operator. I bore a hole in the end of the vessel at the bottom and insert a stopper for the purpose of drawing off the milk, see letter H. I make the floats as herein described to play loose so that they will not swell and become tight when they come in contact with moisture.

What I claim as my invention, and desire to secure by Letters Patent, is—

The application to dashers for churns, of floats that shall close together at their appointed place, when pressed downward through the cream or milk, forcing the cream or milk through narrow spaces, and opening again when raised from the bottom, claiming the right of composing the dasher of any materials, and in any combination of the above decribed parts, so as substantially to produce the same effects.

EDWIN B. CLEMENT.

Witnesses:
R. H. HEATH,
ROBERT HARVEY.